United States Patent
Maddali et al.

(10) Patent No.: US 9,779,428 B2
(45) Date of Patent: Oct. 3, 2017

(54) RECONCILING DETAILED TRANSACTION FEEDBACK

(71) Applicant: eBay Inc., San Jose, CA (US)

(72) Inventors: Lakshman Shyam Sundar Maddali, Fremont, CA (US); Avani Goel Sharma, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 15/297,244

(22) Filed: Oct. 19, 2016

(65) Prior Publication Data

US 2017/0039606 A1    Feb. 9, 2017

Related U.S. Application Data

(63) Continuation of application No. 15/086,858, filed on Mar. 31, 2016, now Pat. No. 9,495,695, which is a continuation of application No. 13/861,556, filed on Apr. 12, 2013, now Pat. No. 9,342,846.

(51) Int. Cl.
*G06F 17/27* (2006.01)
*G06Q 30/02* (2012.01)
*G06F 17/30* (2006.01)

(52) U.S. Cl.
CPC ..... *G06Q 30/0282* (2013.01); *G06F 17/2765* (2013.01); *G06F 17/2785* (2013.01); *G06F 17/3053* (2013.01); *G06F 17/30539* (2013.01)

(58) Field of Classification Search
CPC .. G06Q 30/0282; G06F 17/27; G06F 17/2785
See application file for complete search history.

(56) References Cited

U.S. PATENT DOCUMENTS

| | | | |
|---|---|---|---|
| 8,417,713 B1* | 4/2013 | Blair-Goldensohn | ..................... G06F 17/30699 705/347 |
| 8,738,390 B1* | 5/2014 | Price | .................... G06Q 10/067 705/1.1 |
| 9,201,860 B1* | 12/2015 | Zhang | .................... G06F 17/274 |
| 9,336,192 B1* | 5/2016 | Barba | .................... G06F 17/277 |
| 2003/0191760 A1* | 10/2003 | Cameron | ............ G06F 17/2775 |
| 2005/0091038 A1* | 4/2005 | Yi | ........................ G06F 17/2715 704/10 |
| 2009/0048823 A1* | 2/2009 | Liu | ...................... G06F 17/2765 704/9 |
| 2009/0306967 A1* | 12/2009 | Nicolov | .............. G06F 17/2785 704/9 |
| 2011/0040790 A1* | 2/2011 | Tateno | ................... G06Q 30/02 707/780 |
| 2012/0254060 A1* | 10/2012 | Choudhary | ............ G06Q 30/00 705/347 |

(Continued)

*Primary Examiner* — Eric Yen
(74) *Attorney, Agent, or Firm* — Schwegman Lundberg & Woessner, P.A.

(57) ABSTRACT

Reconciling detailed transaction feedback by detecting a rating of a transaction, where the rating indicates a negative experience, mining the sentiment of words in feedback text that is included with or as part of the rating to detect whether the words indicate positive sentiment or negative sentiment, responsive to determining that the words in the feedback text indicate that the feedback text connotes a positive sentiment, adjusting the rating of the transaction. The mining may include testing words in the feedback text to detect whether the words indicate positive sentiment or negative sentiment by calculating a sentiment score.

19 Claims, 10 Drawing Sheets

(56) References Cited

U.S. PATENT DOCUMENTS

2013/0018968 A1* 1/2013 Pennacchiotti ........ G06Q 10/10
709/206
2013/0231920 A1* 9/2013 Mathew ............ G06F 17/30705
704/9

* cited by examiner

FIG. 6

RECONCILING DETAILED TRANSACTION FEEDBACK

CLAIM OF PRIORITY

This application is a continuation of U.S. application Ser. No. 15/086,858, filed Mar. 31, 2016, which is a continuation of U.S. application Ser. No. 13/861,556, filed Apr. 12, 2013, each of which are hereby incorporated by reference in their entirety.

TECHNICAL FIELD

The present application relates generally to the technical field of user-provided feedback that addresses the user experience in a given online transaction.

BACKGROUND

Ecommerce feedback is one of the core innovations that has enabled the success of ecommerce. It not only showcases the performance of sellers/buyers in the market place but it is also used to incentivize sellers in terms of fees and to measure trust and Bad Buyer Experiences ("BBE") on an ecommerce site. But many customers do not fully understand what each numerical DSR rating, sometimes referred to herein as a detailed seller rating or "DSR" is supposed to mean, sometimes resulting in anomalous or inconsistent DSR's.

BRIEF DESCRIPTION OF THE DRAWINGS

Some embodiments are illustrated by way of example and not limitation in the figures of the accompanying drawings in which:

FIGS. 6 through 8 are user interfaces that may be used in conjunction with the workflows of FIGS. 4 and 5 according to an example embodiment;

DETAILED DESCRIPTION

Figure 1:
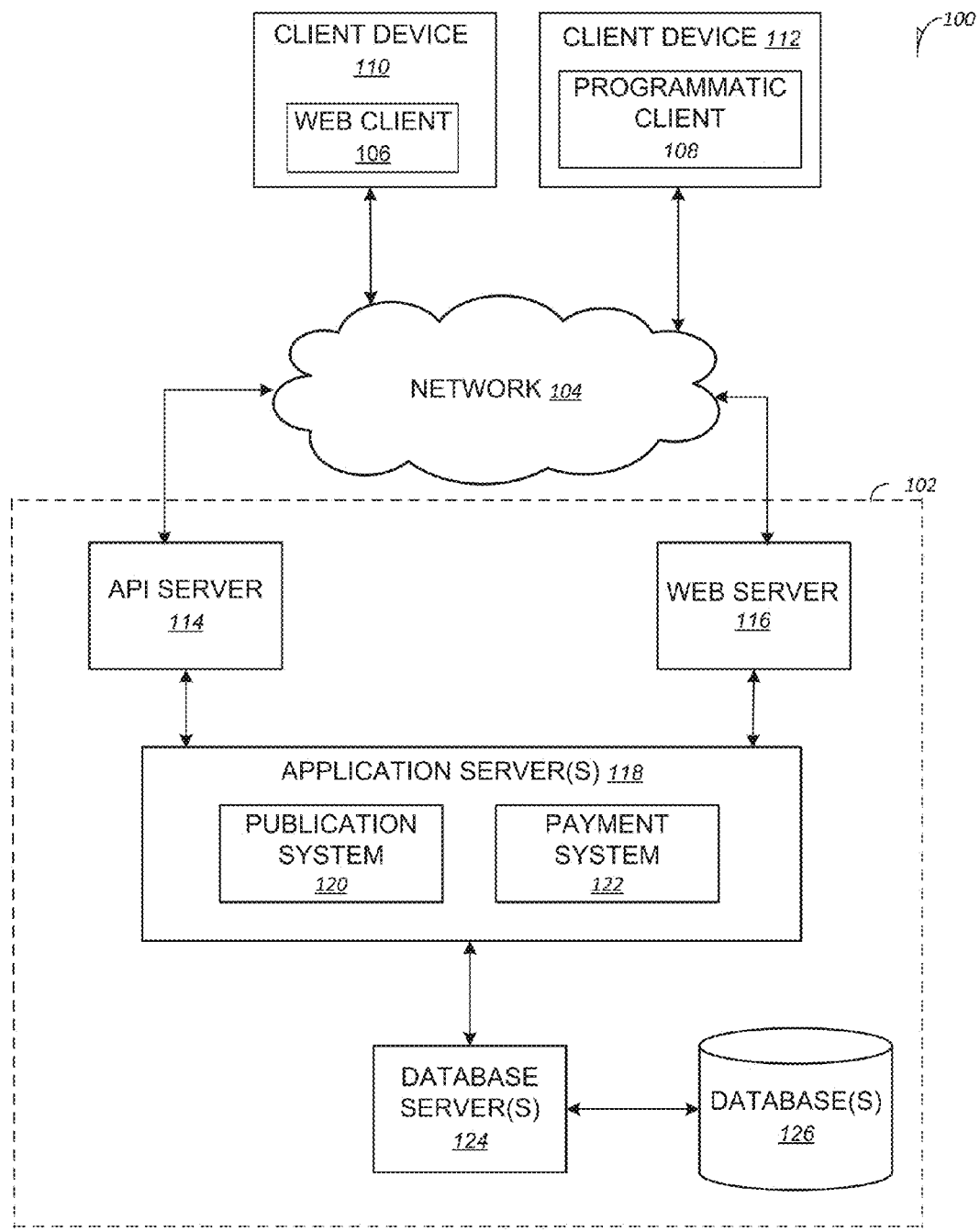
FIG. 1 is a block diagram illustrating a networked system, according to example embodiments.

Ecommerce feedback is one of the core innovations that has enabled the success of ecommerce. It not only showcases the performance of sellers/buyers in the market place but it is also used to incentivize sellers in terms of fees and to measure trust and Bad Buyer Experiences ("BBE") on an ecommerce site. But many customers do not fully understand what each numerical DSR rating, sometimes referred to herein as a detailed seller rating or "DSR" is supposed to mean.

As one example, feedback may be given on some ecommerce sites by users, who may be a buyer, as a numeric scale from 1 to 5, where 1 may be low satisfaction and 5 may be high satisfaction. But the actual scale from 1 to 5 (for example, what level of satisfaction is a 2, what level of satisfaction is a 3, what level of satisfaction is a 4, etc.) it is left to user interpretation.

There are cases on ecommerce sites were buyers leave a numerical DSR=3 rating (often considered a mediocre rating) but give glowing praises to the seller in feedback text which may be filled in as part of the feedback. For example the feedback text may say "Very nice." "Thanks for the quick delivery." "Grandson loves it." "I would buy from you again." But these high praise comments do not comport with the above mediocre DSR rating of 3. In other cases, the foregoing high praise may even result in a DSR rating of 2, which is considered low. These examples illustrate anomalous or even contradictory DSR ratings, for example, the numeral DSR number does not match what one would expect, given the glowing praise of the feedback text, or vice versa. This may be due to the buyer's misunderstanding or misinterpretation of the meaning of each numeral in the 1-5 scale. This may also be due to feedback influenced by biases introduced by such things as cultural aspects and geographical location. For example, some cultures may habitually give low DSRs, even for good service.

Ecommerce site operators have noted that feedback text are often pithy and use very short text. Users may use various decorations using special characters in their feedback text, to make the feedback look pretty. This text, decorations and special characters such as emoticons may indicate the sentiment of emotion of the user when the feedback text is entered. Focusing on feedback phrase level emotion mining, or "sentiment mining," has been found to be useful in understanding more precisely the meaning of a given numerical DSR rating. This emotion mining is not limited to single sentiment in a feedback comment. There could be multiple sentiments within the text of a feedback comment. For example, one part of the feedback text may be positive ("I really liked the jeans") and another part of the feedback text may be negative ("but the shipment took too long to arrive").

Stated another way, sentiment mining is an entire "package" of determining positive sentiment and negative sentiment in feedback text. Sentiment mining may be implemented using not only opinion lexicons containing standard words but may also be implemented from human or machine learned sentiments from negative feedback provided to the ecommerce system over time.

For example, negative modifiers may also be taken into account which, when detected or "mined" from feedback text may be an indication of a bad buying experience ("BBE"). This allows detection of feedback text where the user is not pleased, for example by saying I am not happy. Examples of negative modifiers may be:

TABLE 1 not
none
doesn't
doesnt
didnt
didn't

TABLE 1-continued wouldn't
wouldnt
wont
won't
shouldnt
shouldn't
isn't
isnt
wasnt
wasn't
aren't
arent
werent
weren't
aint
ain't
couldn't
couldnt
can't
cant In addition, certain words used in feedback text may be found, over time, to have specific negative connotations. Examples of words that may be determined to have specific negative connotations may be:

TABLE 2 different
differ
counterfeit
fake
cheap

TABLE 2-continued issue
issues
ignore
ignored
broken
late

Also, certain contrasting conjunctions may be mined and taken into account as a part of sentiment mining. Contrasting conjunctions may detect feedback in which the user makes a positive statement about the seller but also contrasts the positive statement with another, perhaps negative, comment in the feedback text.

Examples of contrasting conjunctions may be:

TABLE 3 but
although
instead
never
yet
than
however

Positive sentiment may be mined using a positive lexicon. For example, positive words such as those in Table 4 below may be used for this purpose. Examples of words of a positive lexicon are seen in the table below. Many additional positive lexicon words will be apparent to those of ordinary skill in the art.

TABLE 4

| | | | | |
|---|---|---|---|---|
| a+ | abound | abounds | abundance | abundant |
| accessable | accessible | acclaim | acclaimed | acclamation |
| accolade | accolades | accommodative | accomodative | accomplish |
| accomplished | accomplishment | accomplishments | accurate | accurately |
| achievable | achievement | achievements | achievible | acumen |
| adaptable | adaptive | adequate | adjustable | admirable |
| admirably | admiration | admire | admirer | admiring |
| admiringly | adorable | adore | adored | adorer |
| adoring | adoringly | adroit | adroitly | adulate |
| adulation | adulatory | advanced | advantage | advantageous |
| advantageously | advantages | adventuresome | adventurous | advocate |
| advocated | advocates | affability | affable | affably |
| affectation | affection | affectionate | affinity | affirm |
| affirmation | affirmative | affluence | affluent | afford |
| affordable | affordably | afordable | agile | agilely |
| agility | agreeable | agreeableness | agreeably | all-around |
| alluring | alluringly | altruistic | altruistically | amaze |
| amazed | amazement | amazes | amazing | amazingly |
| ambitious | ambitiously | ameliorate | amenable | amenity |
| amiability | amiabily | amiable | amicability | amicable |
| amicably | amity | ample | amply | amuse |
| amusing | amusingly | angel | angelic | apotheosis |
| appeal | appealing | applaud | appreciable | appreciate |
| appreciated | appreciates | appreciative | appreciatively | approptiate |
| approval | approve | ardent | ardently | ardor |
| articulate | aspiration | aspirations | aspire | assurance |
| assurances | assure | assuredly | assuring | astonish |
| astonished | astonishing | astonishingly | astonishment | astound |
| astounded | astounding | astoundingly | astutely | attentive |
| attraction | attractive | attractively | attune | audible |
| audibly | auspicious | authentic | authoritative | autonomous |
| available | aver | avid | avidly | award |
| awarded | awards | awe | awed | awesome |
| awesomely | awesomeness | awestruck | awsome | backbone |
| balanced | bargain | beauteous | beautiful | beautiful |
| beautifully | beautify | beauty | beckon | beckoned |
| beckoning | beckons | believable | believeable | beloved |
| benefactor | beneficent | beneficial | beneficially | beneficiary |
| benefit | benefits | benevolence | benevolent | benifits |
| best | best-knonvn | best-performing | best-selling | better |

TABLE 4-continued

| | | | | |
|---|---|---|---|---|
| better-known | better-than-expected | beutifully | blameless | bless |
| blessing | bliss | blissful | blissfully | blithe |
| blockbuster | bloom | blossom | bolster | bonny |
| bonus | bonuses | boom | booming | boost |
| boundless | bountiful | brainiest | brainy | brand-new |
| brave | bravery | bravo | breakthrough | breakthroughs |
| breathlessness | breathtaking | breathtakingly | breeze | bright |
| brighten | brighter | brightest | brilliance | brilliances |
| brilliant | brilliantly | brisk | brotherly | bullish |
| buoyant | cajole | calm | calming | calmness |
| capability | capable | capably | captivate | captivating |
| carefree | cashback | cashbacks | catchy | celebrate |
| celebrated | celebration | celebratory | champ | champion |

In addition, colloquialisms that may be specific to a given ecommerce system, as well as slang and sarcasms, may be detected in feedback text and used in sentiment mining. Further, there may be cases taken into account in the sentiment mining described where words in the feedback text that typically indicate negative sentiment bearing may not, in fact, be negative. For example, in the term "excellent worn-out jeans," the term "worn-out" is usually a negative term. However, if the product were so called "destroyed jeans" (that is, jeans manufactured to be faded or torn to give the appearance of having been worn and washed several times) the term "worn-out" could be considered a positive sentiment.

The following disclosure addresses these problems by extracting the sentiment from the feedback text using the components discussed above for sentiment mining, and then reconciling the sentiment with the numerical DSR rating. The DSRs may then be normalized by eliminating individual biases. This may be done for individual buyers sometimes referred to as being done on a "per buyer" basis.

In an embodiment, offline data mining preparation may include mining from one or more historical ecommerce transaction logs. Known specific negative words may be mined from the text of feedback text from the transaction log. Phrase-level emotion or sentiment language may be mined from the feedback text to detect negative sentiment. The average numerical DSRs may be analyzed, in one embodiment on a continual basis, for each geography of the ecommerce system, each category of listed item, each average selling price, and the like. These average DSRs may later be used in DSR normalization to be discussed below.

Sentiment may then be mined from the feedback text and compared with the respective DSRs provided by the user. The discrepancy between the mined negative sentiments and the respective DSRs may be reconciled in the flow. Reconciliation may be done either real-time online when the buyer is leaving contradictory feedback or in an offline mode where separate offline survey could be conducted to derive the weights the current DSR rating should carry when it differs from feedback text. Weights given to the DSRs may then be auto-adjusted to reflect the disagreement between the numerical value of the DSRs and the mined sentiments from the DSRs. DSR ratings may be computed by taking a simple average of all the DSRs given to a seller by buyers of his items. A way of deriving at the aggregate DSR ratings could be envisioned in which weight for the ratings, where the feedback text and rating do not appear consistent, is lowered. The exact weight could be derived in a data driven way. For example, in an embodiment, a selective offline survey may be addressed to buyers who left numerical DSRs that did not match the detected sentiment in the feedback text that the buyers left with their DSRs. The answers to the survey may be used in DSR normalization.

FIG. 1 is a diagram depicting a networked system 100, according to one embodiment, having a client-server architecture configured for exchanging data over a network. For example, the networked system 100 may include a network-based publisher 102 where clients may communicate and exchange data within the networked system 100. The data may pertain to various functions (e.g., online item purchases) and aspects (e.g., managing content) associated with the networked system 100 and its users. Although illustrated herein as a client-server architecture as an example, other embodiments may include other networked architectures, such as a peer-to-peer or distributed networked environment.

A data exchange platform, in an example form of a network-based publisher 102, may provide server-side functionality, via a network 104 (e.g., the Internet; wireless network, cellular network, or a Wide Area. Network (WAN)) to one or more clients. The one or more clients may include users that utilize the networked system 100 and more specifically, the network-based publisher 102, to exchange data over the network 104. These transactions may include transmitting, receiving (communicating) and processing data to, from, and regarding content and users of the networked system 100. The data may include, but are not limited to, content and user data such as feedback data; user profiles; user attributes; product attributes; product and service reviews; product, service, manufacture, and vendor recommendations and identifiers; social network commentary, product and service listings associated with buyers and sellers; auction bids; and transaction data; among other things.

In various embodiments, the data exchanges within the networked system 100 may be dependent upon user-selected functions available through one or more client or user interfaces (UIs). The UIs may be associated with a client device, such as a client device 110 using a web client 106. The web client 106 may be in communication with the network-based publisher 102 via a web server 116. The UIs may also be associated with a client device 112 using a programmatic client 108, such as a client application. It can be appreciated in various embodiments the client devices 110, 112 may be associated with a buyer, a seller, a third party electronic commerce platform, a payment service provider, or a shipping service provider, each in communication with the network-based publisher 102 and optionally each other. The buyers and sellers may be any one of individuals, merchants, or service providers, among other things. The client devices 110 and 112 may comprise a mobile phone, desktop computer, laptop, or any other communication device that a user may use to access the network-based publisher 102.

Turning specifically to the network-based publisher 102, an application program interface (API) server 114 and a web server 116 are coupled to, and provide programmatic and web interfaces respectively to, one or more application servers 118. The application servers 118 host one or more publication application(s) of publication system 120 and one or more payment systems 122. The application server(s) 118 are, in turn, shown to be coupled to one or more database server(s) 124 that facilitate access to one or more database(s) 126.

In one embodiment, the web server 116 and the API server 114 communicate and receive data pertaining to products, listings, transactions, social network commentary and feedback, among other things, via various user input tools. For example, the web server 116 may send and receive data to and from a toolbar or webpage on a browser application (e.g., web client 106) operating on a client device (e.g., client device 110). The API server 114 may send and receive data to and from an application (e.g., client application 108) running on another client device (e.g., client device 112).

The publication system 120 publishes content on a network (e.g., the Internet). As such, the publication system 120 provides a number of publication and marketplace functions and services to users that access the network-based publisher 102. For example, the publication application(s) of publication system 120 may provide a number of services and functions to users for listing goods and/or services for sale, facilitating transactions, and reviewing and providing feedback about transactions and associated users. Additionally, the publication application(s) of publication system 120 may track and store data and metadata relating to products, listings, transactions, and user interaction with the network-based publisher 102. The publication application(s) of publication system 120 may aggregate the tracked data and metadata to perform data mining to identify trends or patterns in the data. While the publication system 120 may be discussed in terms of a marketplace environment, it may be noted that the publication system 120 may be associated with a non-marketplace environment.

The payment system 122 provides a number of payment services and functions to users. The payment system 122 allows users to accumulate value (e.g., in a commercial currency, such as the U.S. dollar, or a proprietary currency, such as "points") in accounts, and then later to redeem the accumulated value for products (e.g., goods or services) that are made available via the publication system 120. The payment system 122 also facilitates payments from a payment mechanism (e.g., a bank account, PayPal account, or credit card) for purchases of items via the network-based marketplace. While the publication system 120 and the payment system 122 are shown in FIG. 1 to both form part of the network-based publisher 102, it will be appreciated that, in alternative embodiments, the payment system 122 may form part of a payment service that may be separate and distinct from the network-based publisher 102.

Application Server(s)

Figure 2:
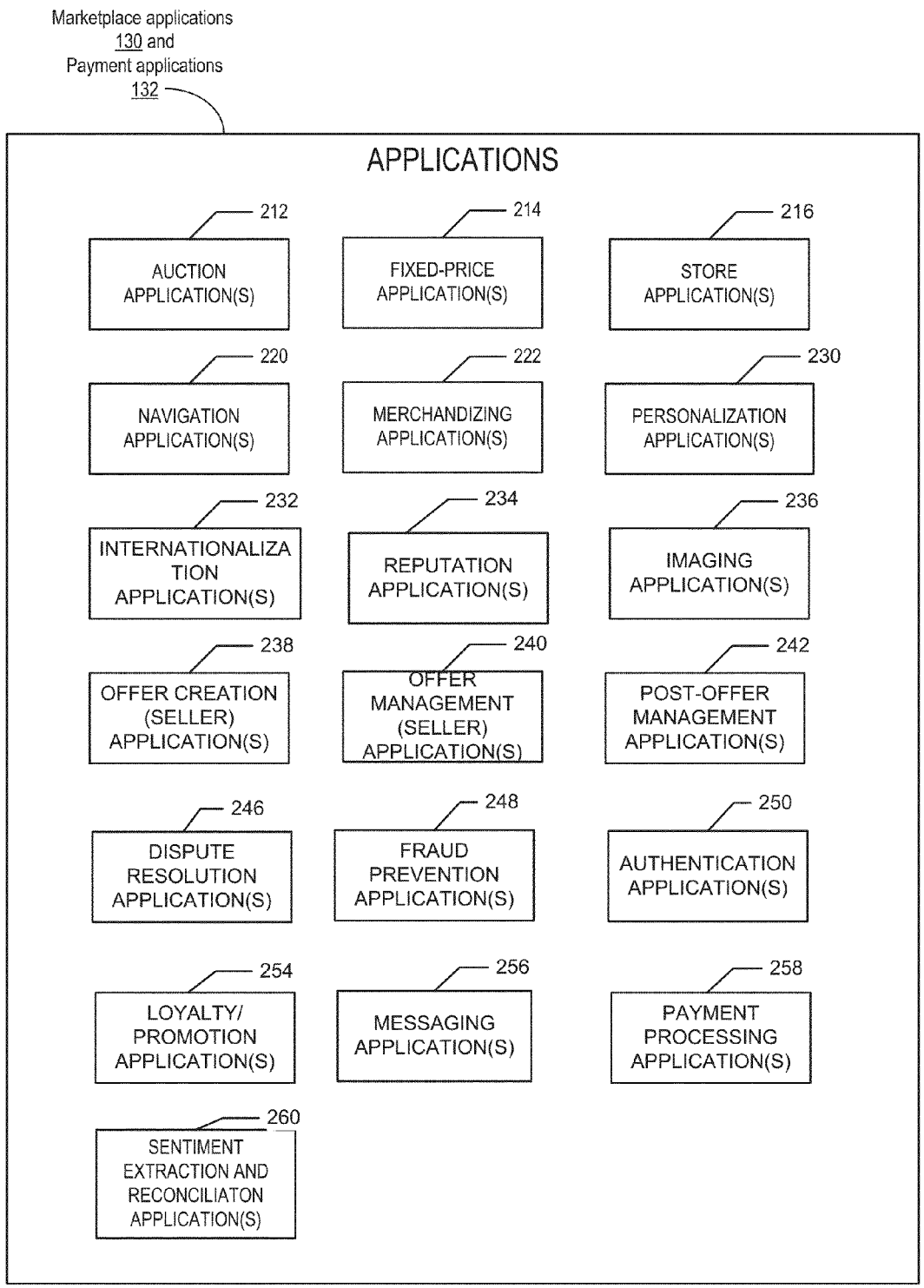
FIG. 2 is a block diagram of application servers that may form a part of the networked system of FIG. 1, according to example embodiments

FIG. 2 illustrates a block diagram showing applications of application server(s) that are part of the networked system 100, in an example embodiment. In this embodiment, the publication system 120, and the payment system 120 may be hosted by the application server(s) 118 of the networked system 100. The publication system 120 and the payment system 132 may be hosted on dedicated or shared server machines (not shown) that are communicatively coupled to enable communications between server machines. The applications themselves may be communicatively coupled (e.g., via appropriate interfaces) to each other and to various data sources, so as to allow information to be passed between the applications or so as to allow the applications to share and access common data.

The publication system 120 are shown to include at least one or more auction application(s) 212 which support auction-format listing and price setting mechanisms (e.g., English, Dutch, Vickrey, Chinese, Double, Reverse auctions etc.). The auction application(s) 212 may also provide a number of features in support of such auction-format listings, such as a reserve price feature whereby a seller may specify a reserve price in connection with a listing and a proxy-bidding feature whereby a bidder may invoke automated proxy bidding. The auction-format offer in any format may be published in any virtual or physical marketplace medium and may be considered the point of sale for the commerce transaction between a seller and a buyer (or two users).

One or more fixed-price application(s) 214 support fixed-price listing formats (e.g., the traditional classified advertisement-type listing or a catalogue listing) and buyout-type listings. Specifically, buyout-type listings (e.g., including the Buy-It-Now® (BIN) technology developed by eBay Inc., of San Jose, Calif.) may be offered in conjunction with auction-format listings, and allow a buyer to purchase goods or services, which are also being offered for sale via an auction, for a fixed-price that may be typically higher than the starting price of the auction.

The application(s) of the application server(s) 118 may include one or more store application(s) 216 that allow a seller to group listings within a "virtual" store. The virtual store may be branded and otherwise personalized by and for the seller. Such a virtual store may also offer promotions, incentives and features that are specific and personalized to a relevant seller.

Navigation of the online marketplace may be facilitated by one or more navigation application(s) 220. For example, a search application (as an example of a navigation application) may enable key word searches of listings published via the network-based publisher 102. A browse application may allow users to browse various category, catalogue, or inventory data structures according to which listings may be classified within the network-based publisher 102. Various other navigation applications may be provided to supplement the search and browsing applications.

Merchandizing application(s) 222 support various merchandising functions that are made available to sellers to enable sellers to increase sales via the network-based publisher 102. The merchandizing application(s) 222 also operate the various merchandising features that may be invoked by sellers, and may monitor and track the success of merchandising strategies employed by sellers.

Personalization application(s) 230 allow users of the network-based publisher 102 to personalize various aspects of their interactions with the network-based publisher 102. For example, a user may, utilizing an appropriate personalization application 230, create a personalized reference page at which information regarding transactions to which the user may be (or has been) a party may be viewed. Further, the personalization application(s) 230 may enable a third party to personalize products and other aspects of their interactions with the network-based publisher 102 and other parties, or to provide other information, such as relevant business information about themselves.

The publication system 120 may include one or more internationalization application(s) 232. In one embodiment, the network-based publisher 102 may support a number of marketplaces that are customized, for example, for specific geographic regions. A version of the network-based publisher 102 may be customized for the United Kingdom, whereas another version of the network-based publisher 102 may be customized for the United States. Each of these versions may operate as an independent marketplace, or may be customized (or internationalized) presentations of a common underlying marketplace. The network-based publisher 102 may accordingly include a number of internationalization application(s) 232 that customize information (and/or the presentation of information) by the network-based publisher 102 according to predetermined criteria (e.g., geographic, demographic or marketplace criteria). For example, the internationalization application(s) 232 may be used to support the customization of information for a number of regional websites that are operated by the network-based publisher 102 and that are accessible via respective web servers.

Reputation application(s) 234 allow users that transact, utilizing the network-based publisher 102, to establish, build and maintain reputations, which may be made available and published to potential trading partners. Consider that where, for example, the network-based publisher 102 supports person-to-person trading, users may otherwise have no history or other reference information whereby the trustworthiness and credibility of potential trading partners may be assessed. The reputation application(s) 234 allow a user, for example through feedback provided by other transaction partners, to establish a reputation within the network-based publisher 102 over time. Other potential trading partners may then reference such a reputation for the purposes of assessing credibility and trustworthiness.

In order to make listings, available via the network-based publisher 102, as visually informing and attractive as possible, the publication system 120 may include one or more imaging application(s) 236 utilizing which users may upload images for inclusion within listings. An imaging application 236 also operates to incorporate images within viewed listings. The imaging application(s) 236 may also support one or more promotional features, such as image galleries that are presented to potential buyers. For example, sellers may generally pay an additional fee to have an image included within a gallery of images for promoted items.

The publication system 120 may include one or more offer creation application(s) 238. The offer creation application(s) 238 allow sellers conveniently to author products pertaining to goods or services that they wish to transact via the network-based publisher 102. Offer management application(s) 240 allow sellers to manage offers, such as goods, services, or donation opportunities. Specifically, where a particular seller has authored and/or published a large number of products, the management of such products may present a challenge. The offer management application(s) 240 provide a number of features (e.g., auto-reproduct, inventory level monitors, etc.) to assist the seller in managing such products. One or more post-offer management application(s) 242 also assist sellers with a number of activities that typically occur post-offer. For example, upon completion of an auction facilitated by one or more auction application(s) 212, a seller may wish to leave feedback regarding a particular buyer. To this end, a post-offer management application 242 may provide an interface to one or more reputation application(s) 234, so as to allow the seller conveniently to provide feedback regarding multiple buyers to the reputation application(s) 234.

The dispute resolution application(s) 246 may provide mechanisms whereby disputes arising between transacting parties may be resolved. For example, the dispute resolution application(s) 246 may provide guided procedures whereby the parties are guided through a number of steps in an attempt to settle a dispute. In the event that the dispute cannot be settled via the guided procedures, the dispute may be escalated to a mediator or arbitrator.

The fraud prevention application(s) 248 may implement various fraud detection and prevention mechanisms to reduce the occurrence of fraud within the network-based publisher 102. The fraud prevention application(s) may prevent fraud with respect to the third party and/or the client user in relation to any part of the request, payment, information flows and/or request fulfillment. Fraud may occur with respect to unauthorized use of financial instruments, non-delivery of goods, and abuse of personal information.

Authentication application(s) 250 may verify the identity of a user, and may be used in conjunction with the fraud prevention application(s) 248. The user may be requested to submit verification of identity, an identifier upon making the purchase request, for example. Verification may be made by a code entered by the user, a cookie retrieved from the device, a phone number/identification pair, a username/password pair, handwriting, and/or biometric methods, such as voice data, face data, iris data, finger print data, and hand data. In some embodiments, the user may not be permitted to login without appropriate authentication. The system (e.g., the FSP) may automatically recognize the user, based upon the particular network-based device used and a retrieved cookie, for example.

The network-based publisher 102 itself, or one or more parties that transact via the network-based publisher 102, may operate loyalty programs and other types of promotions that are supported by one or more loyalty/promotions application(s) 254. For example, a buyer/client user may earn loyalty or promotions points for each transaction established and/or concluded with a particular seller/third party, and may be offered a reward for which accumulated loyalty points can be redeemed.

The application server(s) 118 may include messaging application(s) 256. The messaging application(s) 256 are responsible for the generation and delivery of messages to client users and third parties of the network-based publisher 102. Information in these messages may be pertinent to services offered by, and activities performed via, the payment system 120. Such messages, for example, advise client users regarding the status of products (e.g., providing "out of stock" or "outbid" notices to client users) or payment status (e.g., providing invoice for payment. Notification of a Payment Received, delivery status, invoice notices). Third parties may be notified of a product order, payment confirmation and/or shipment information. Respective messaging application(s) 256 may utilize any one of a number of message delivery networks and platforms to deliver messages to users. For example, messaging application(s) 256 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

The payment system 120 may include one or more payment processing application(s) 258. The payment processing application(s) 258 may receive electronic invoices from the merchants and may receive payments associated with the electronic invoices. The payment system 120 may also make use of functions performed by some applications included in the publication system 120.

The publication system 120 may include one or more sentiment extraction and reconciliation applications 260.

Figure 3:
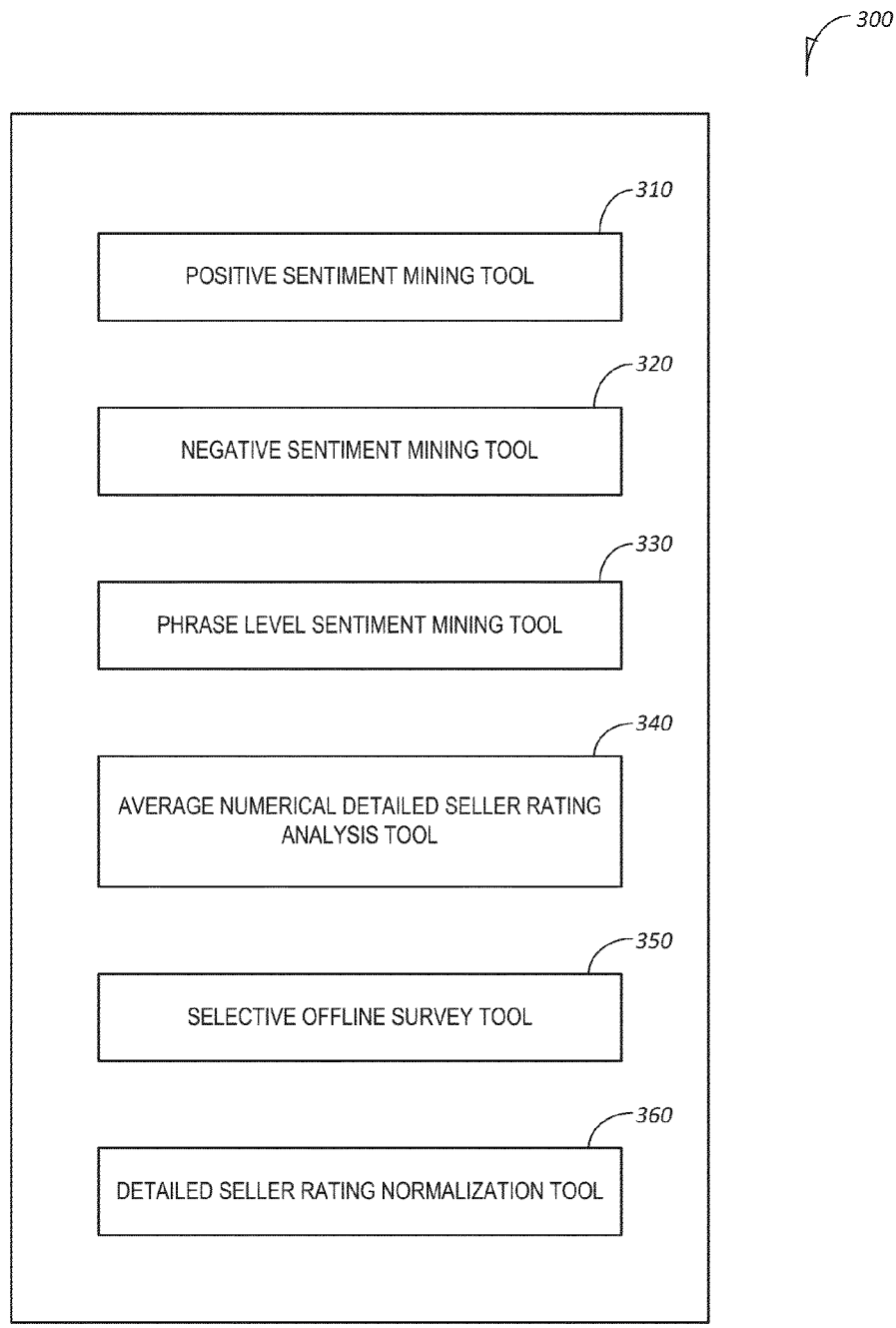
FIG. 3 is an illustration of a sentiment extraction and reconciliation application according to an example embodiment.

FIG. 3 is an illustration of a sentiment extraction and reconciliation application 300, which is a further description of item 260 of FIG. 2 according to an example embodiment. In one embodiment sentiment extraction and reconciliation application 300 of FIG. 3 may operate offline if desired and may mine historical transaction logs of an ecommerce system. This sentiment mining may be done on a continual basis if desired, or mined from time to time. Item 300 may include positive sentiment mining tool 310 which may be an application for detecting positive words such as those in Table 1, or other words learned to indicate positive sentiment.

Item 300 may also include negative sentiment mining tool 320 which may be an application for detecting negative modifiers such as those of Table 1, above, detecting words having negative connotations, such as those of Table 2, above, and detecting contrasting conjunctions such as those in Table 3, above; and also for detecting words learned to indicate negative sentiment.

Phrase level sentiment mining tool 330 may be an application for detecting phrase-level sentiment. The comments left by Buyers for sellers are pithy and can cover various aspects of the transaction in a not grammatically well formed manner. For example, a feedback comment could be "Got it fast, received in great condition". Here buyer is expressing his feelings about ship time as well as item condition. These two comment segments may be separated using the obvious markers like comma, semi colon, colon, multiple spaces or tabs, periods and other punctuation marks. When no punctuation marks are available, probabilistic techniques like Hidden Markov Models (HMM) could be used to break one feedback comment into comment segments. Once comment segments are identified, sentiment mining could be done on each phrase/segment to extract positive/negative feelings of the buyer towards a specific aspect of the transaction.

Average numerical detailed seller rating (DSR) analysis tool 340 may be an application for analyzing the DSR of users in the transaction logs. Item 340 may analyze, on a continual basis if desired, or periodically, may analyze average DSRs left selected geographies, item listing category, average selling price, and/or other desirable indicators to determine whether there is any feedback bias in any of the foregoing selections, for example, by culture, country, or otherwise. In one embodiment the average DSR rating given by a user in the past year for positive feedback transactions may be detected. Then that average may be applied to current DSRs to determine true BBEs in those DSRs.

Selective offline survey 350 may be an application for surveying buyers whose DSRs were detected in the above analysis not to match the sentiment in the respective buyer's sentiment in the feedback texts. This clarification survey may reconcile the meaning of the feedback text and a DSR. In one embodiment the results of this clarification survey may be used to adjust the DSR or the feedback text.

Detailed seller rating normalization tool 360 may then normalize seller ratings according to an auto-adjustment procedure. The tool may find the average IAD detailed seller rating that a buyer tends to leave. This average is computed for each buyer's transactions in the past year for which positive feedback was left and no dispute was filed by the buyer. This average value for each buyer can be used to normalize his DSRs.

Figure 4:
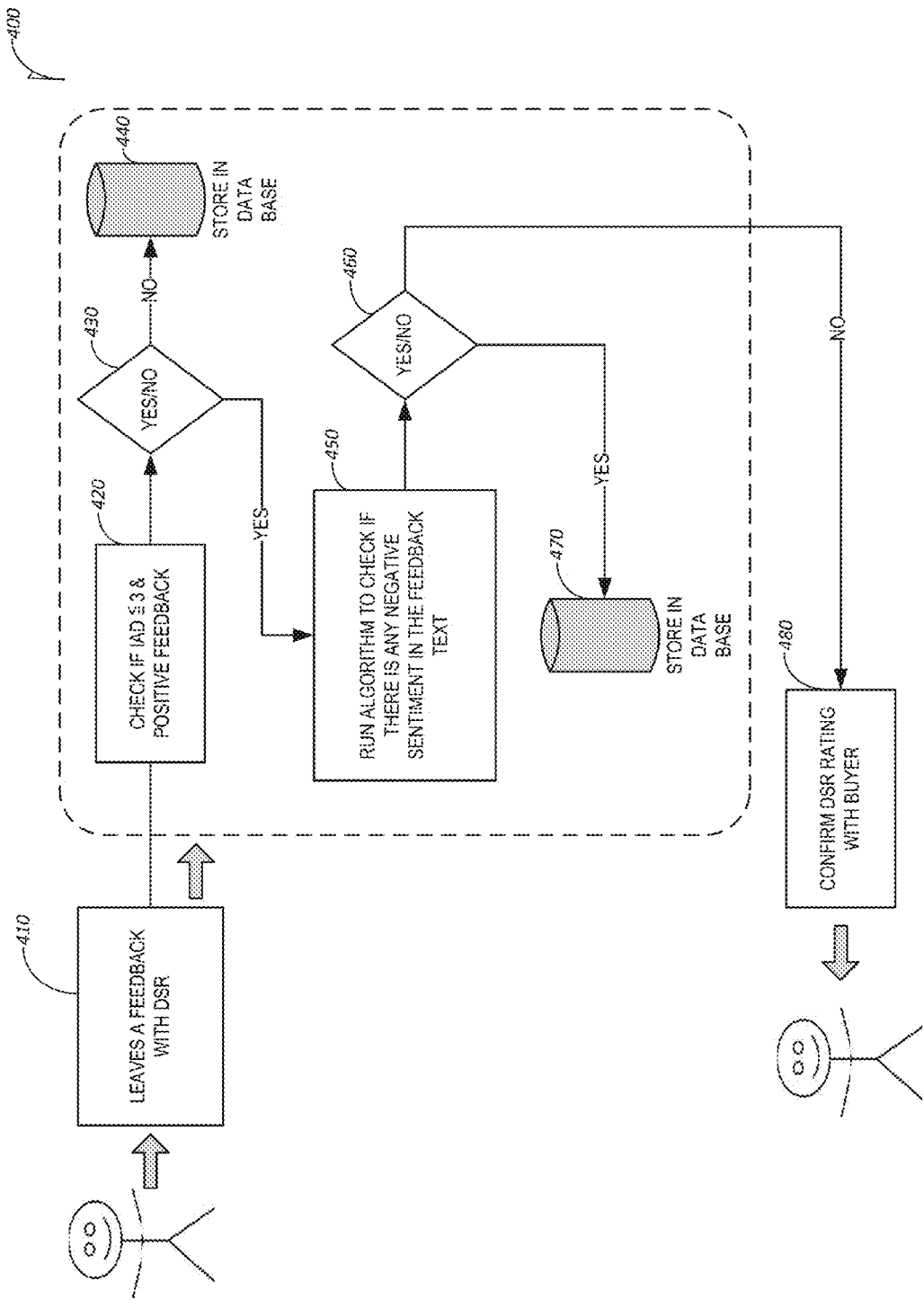
FIG. 4 is an illustration of flowchart of sentiment mining according to an example embodiment.

FIG. 4 is an illustration of flowchart, or work flow, of sentiment mining according to an example embodiment. At 410 a user, here a buyer, provides feedback text and a numerical detailed seller rating. This may be seen in further detail on the user interface 410A of FIG. 6 in which the seller has the opportunity of rating the transaction at 411A, of leaving feedback text at 413A, and of providing one or more numerical DSRs about the purchase at 415A. In this example embodiment the scale may indicate 1-5 reading left to right, where 1 is low and 5 is high. The detailed seller rating normalization 360 tool finds the average IAD DSR that a buyer tends to leave. This average is computed for each buyer's transactions in the past year for which positive feedback was left and no dispute was filed by the buyer. This average value for each buyer can be used to normalize his DSRs.

At 420 whether the DSR is less than or equal to a 3 is checked for by well-known comparison methods. As discussed above, a rating of 3 is considered in the present instance as being a mediocre rating, so ratings of 3 or less are used for checking purposes. A reason for checking for ratings of 3 or less is that as part of analyzing feedback text to understand the reasons why negative/neutral DSR may be provided, initial analysis began by looking into feedback text. Inasmuch as IAD DSRs (ratings of the truth of the "Item As Described") form a good portion of BBEs, analysis initially focused on AD DSRs of less than or equal to 3 (which, while "mediocre" may for business purposes be considered an indication of a BBE) and on the corresponding BBEs. Analyzing the feedback text of the few of the IAD DSRs that were less than or equal to 3, indicated that there were a good amount of purely positive feedback text in IAD DSRs that numerically indicated a BBE. This appears to be a contradiction. This determination may be performed using specific positive word mining tool 310, negative sentiment mining tool 320, and phase level sentiment mining tool 330 as discussed further below. At 430 a determination of whether there is positive feedback in the feedback text is made. If there is no positive feedback for an IAD of less than or equal to 3, the feedback is considered non-contradictory, and it is stored in database 440 for subsequent use. A positive sentiment word lexicon such as that in Table 4 may be used to see if there are positive sentiments in the Feedback. Using this along with negative modifier lists, and contrasting conjunctions, discussed above, allows determining if the feedback has only positive sentiment.

Figure 7:
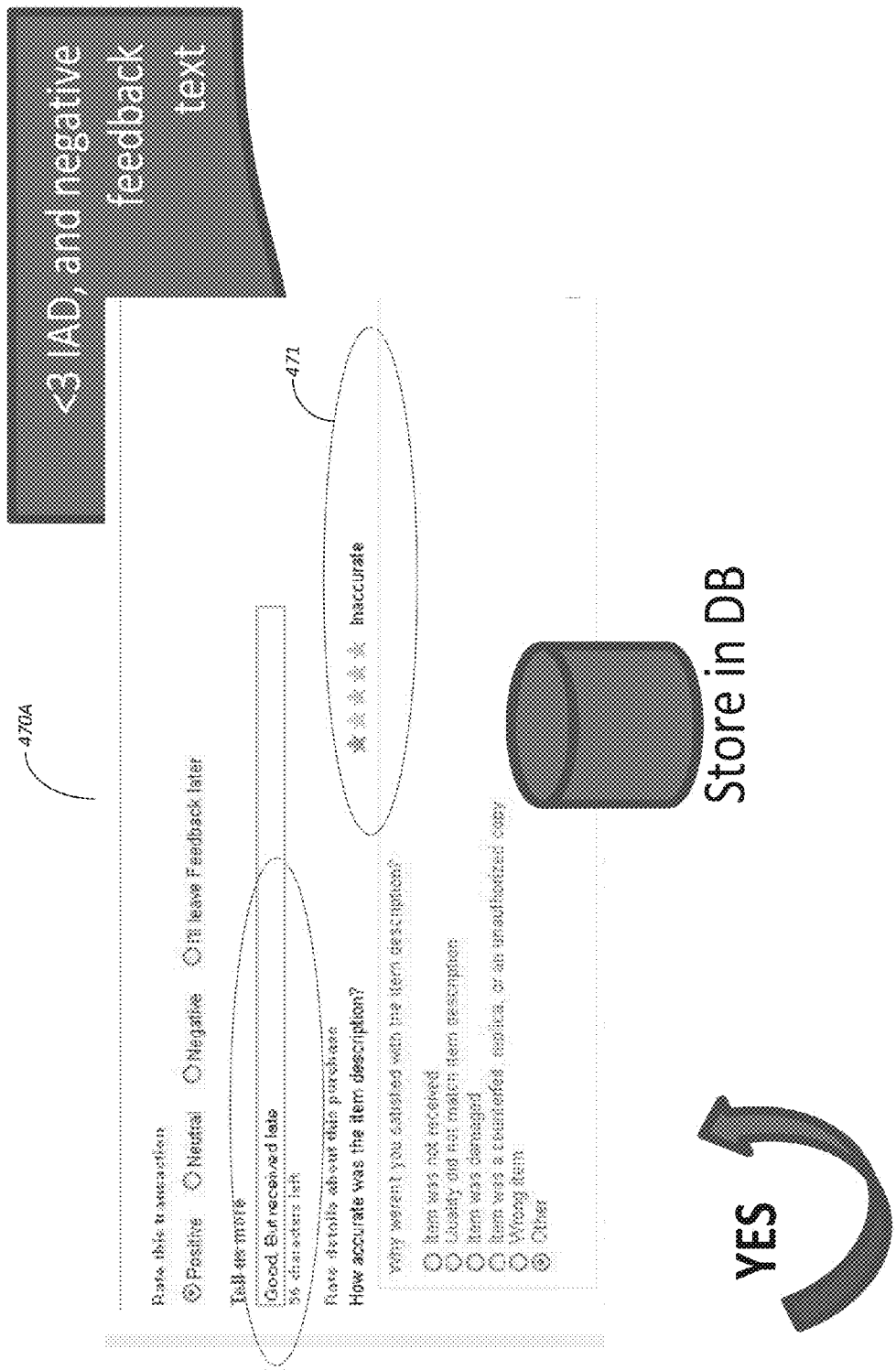

If, on the other hand, there is positive feedback text in an IAD of less than or equal to 3, an algorithm, discussed below, is run at 450 to check if there is any negative sentiment in the feedback text. Again, this may be accomplished at least in part by phrase level sentiment mining tool 330 discussed above in connection with FIG. 3. If the decision at 460 is yes (i.e., there is negative sentiment in the feedback text), then the feedback text and the low IAD DSR may be considered to be consistent. An example of this is seen at the UI 470A of FIG. 7. In this case, the feedback text ("But received late") was negative, and the IAD DSR at 471 was 2, so the negative feedback text and the low IAD are thought to be consistent, and the IAD DSR is stored in database 470 in FIG. 4 for future use.

Figure 8:
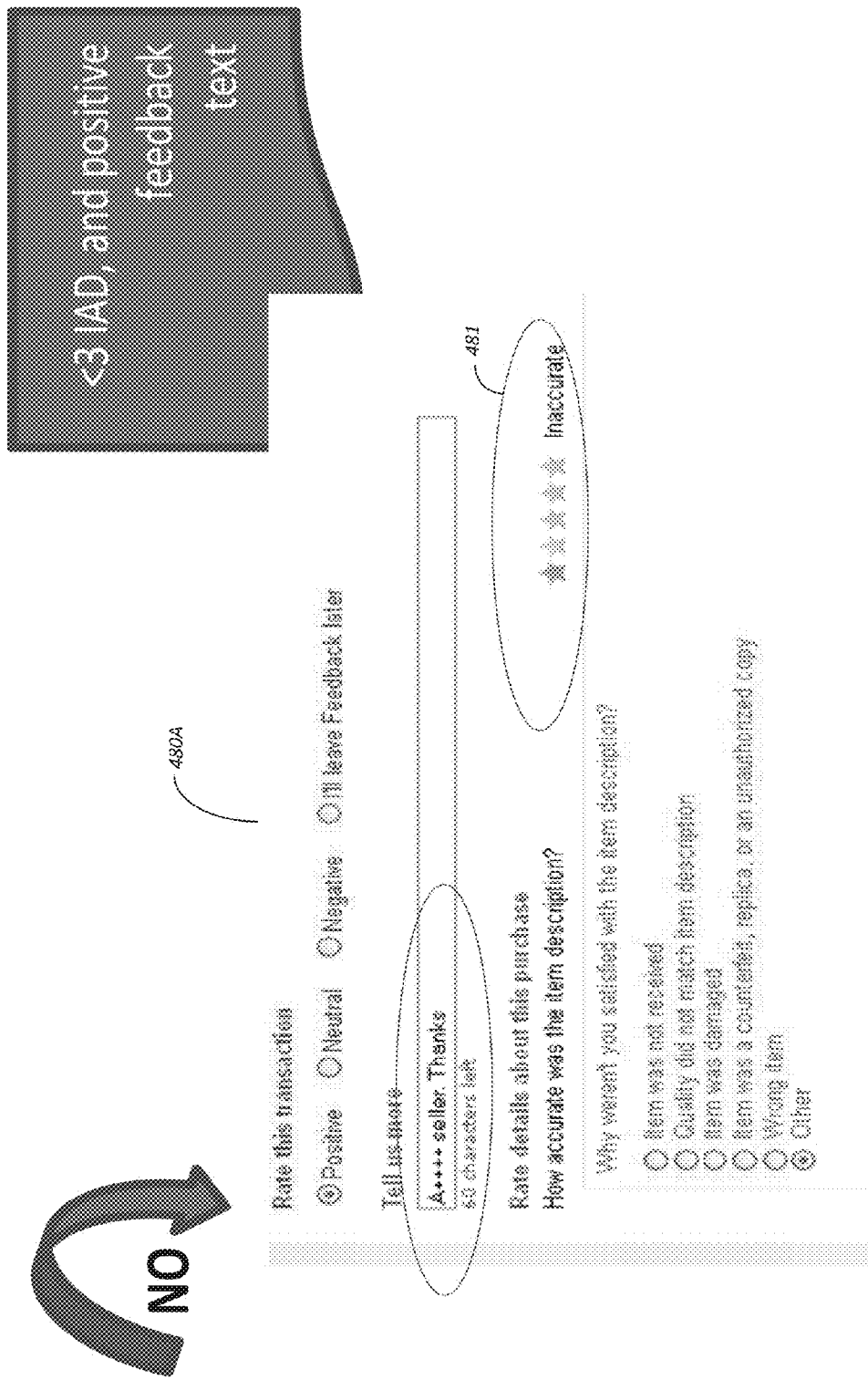

If decision 460 detects that there is no negative sentiment feedback then the feedback text and the IAD DSR of 2 may be considered inconsistent and the DSR may be confirmed with the buyer as at 480 so that discrepancies between the feedback text and the IAD numerical rating are reconciled. This inconsistency may be seen at the user interface 480A in FIG. 8 where the transaction is rated "positive," (i.e., the feedback text is "A++++ seller. Thanks.") but the IAD is a 2, as at 481.

Figure 5:
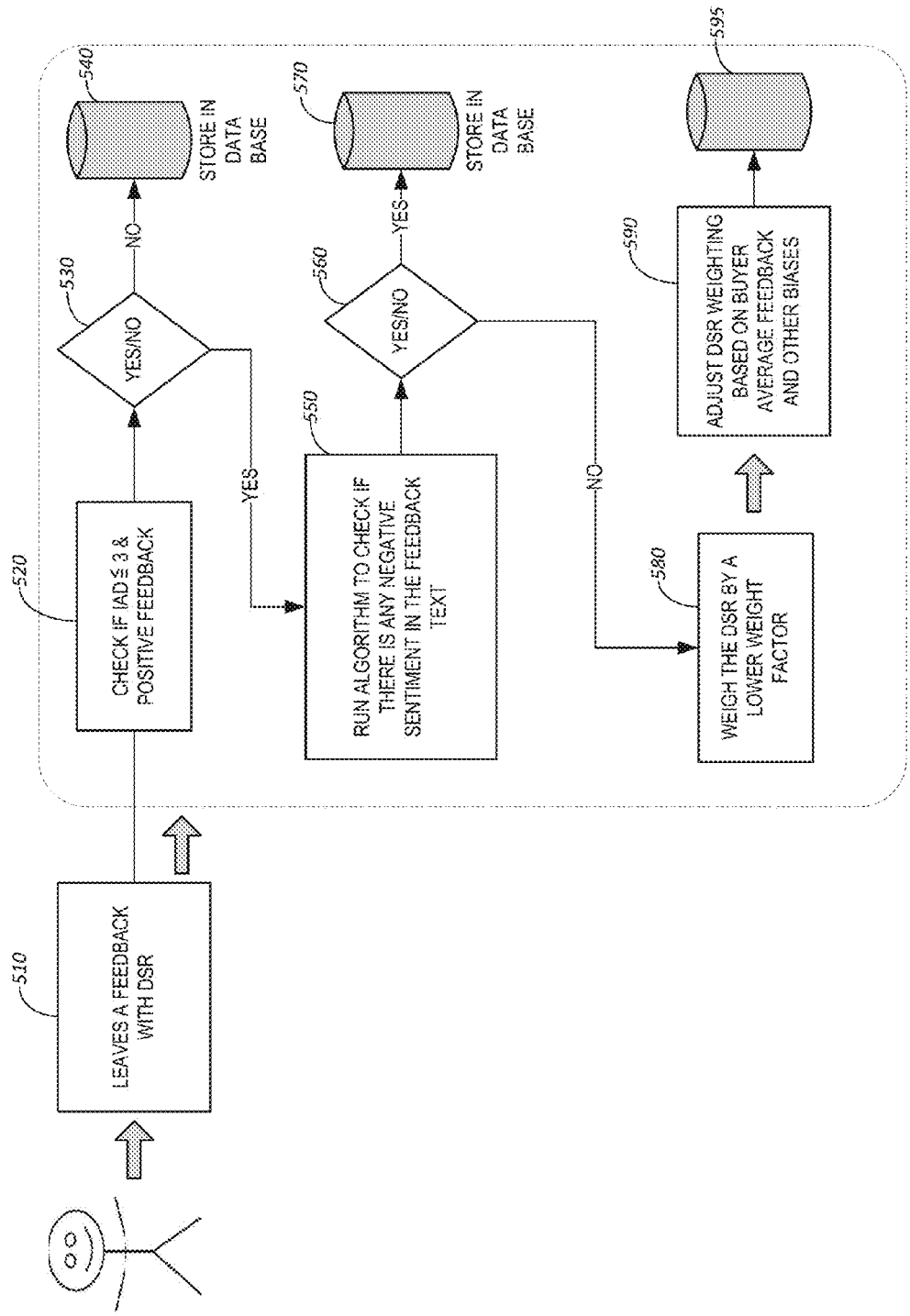
FIG. 5 is an illustration of a flowchart of sentiment mining showing adjusting feedback about a seller according to an example embodiment.

FIG. 5 is an illustration of a flowchart of sentiment mining showing adjusting feedback about a seller according to an example embodiment. FIG. 5 is much the same as FIG. 4 so only the differences will be discussed here. These differences are that if the decision 560 from the algorithm that is run at 550 (which may be the same algorithm as at step 450 of FIG. 4) is that there is no negative sentiment expressed in the feedback text, then the low IAD of less than or equal to 3, and the lack of negative sentiment in the feedback text, appear inconsistent. This may be reconciled as indicated at 580 by assigning a lower weight factor to the DSR because of the apparent inconsistency. The DSR weighting may be based on buyer average feedback and other biases. As discussed above, these biases may be geographies, item listing category, average selling price, and/or other desirable indicators to determine whether there is any feedback bias in any of the foregoing selections, for example, by culture, country, or otherwise. The adjustment may also be based on average feedback, for example, whether the DSR is significantly different from the DSRs of the user as averaged over a previous period of time as discussed above.

Figure 9:
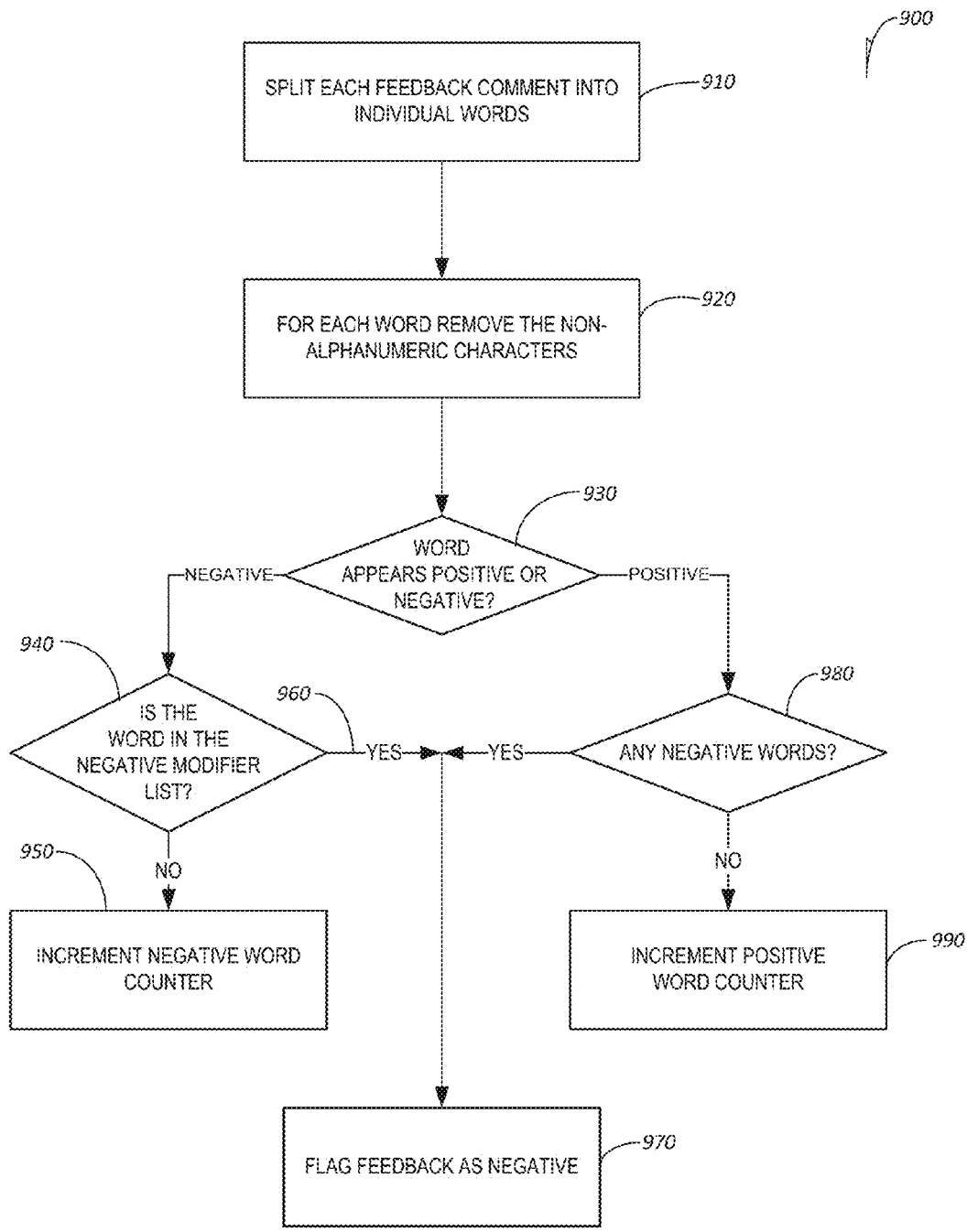
FIG. 9 is a flowchart illustrating a method according to an example embodiment.

FIG. 9 is a flowchart illustrating a method 900 according to an example embodiment. In sentiment mining of feedback texts, the particular feedback text may be split into individual words as at 910. The non-alphanumeric characters may be removed from each word as at 920. At 930 a determination is made as to whether the sentiment of the word under test in the particular feedback text appears positive or negative. The test for positive sentiment may be made using positive sentiment mining tool 310 testing for words such as those in Table 4, and words learned to indicate positive sentiment. The test for negative sentiment may be made using negative sentiment mining tool 320 testing for words such as those in Tables 1, and 3, and words learned to indicate negative sentiment. If the test at 930 determines that the sentiment of the word under test appears positive, then at 980 a decision is made as to whether there are any negative words in the particular feedback text of which the word under test is a part. If Yes, then the feedback text may be flagged as negative as at 970. If No, then a positive word counter for the particular feedback text may be incremented. The determination of whether there are any negative words in the particular feedback text (in test 980) may be implemented by testing to determine whether all words in the feedback text have been tested. For example a loop (not shown) could be embodied that determines whether a negative word has been detected in the particular feedback text and, if not, testing to see if the final word of the particular feedback text has been tested for negative. If the final word in a particular feedback text has been tested without encountering a negative word, this would be an indicator to increment the positive word counter as at 990, and as discussed above.

With continued reference to FIG. 9, if sentiment of a word appears negative at 930 then a test is made at 940 to determine whether the word is in the negative modifier list of Table 1. If the word is in the negative modifier list, the feedback text is flagged as negative at 970, which indicates that the feedback text indicates negative sentiment.

When the test for the particular feedback text is completed (which may be tested by implementation of a loop similar to that discussed above for FIG. 9) the negative word counter and the positive word counter indicate that the feedback test is are totaled and the ratio of positive/(positive+negative) may be used to determine if the feedback is significantly positive. Stated another way, the total and ratio may be considered a calculation of a score or threshold which, if it exceeds a predetermined amount, indicates that the feedback text indicates an overall positive sentiment. The thresholds of positiveness of a feedback comment may be very high but could be adjusted as needed. In one embodiment, the score or threshold is calculated if the test at 940 does not result in the feedback text being flagged as negative as at 970.

When the test for the particular feedback text is completed (which may be tested by implementation of a loop similar to that discussed above for FIG. 9) the negative word counter and the positive word counter are totaled and the ratio of positive/(positive+negative) may be used to determine if the feedback is significantly positive. The thresholds of positiveness of a feedback text may be very high but could be adjusted as needed.

Modules, Components, and Logic

Additionally, certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as may be known by a skilled artisan) as a module that operates to perform certain operations described herein.

In various embodiments, a module may be implemented mechanically or electronically. For example, a module may comprise dedicated circuitry or logic that may be permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that may be temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that may be physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it may be communicatively coupled. A further module may then, at a later time, access the memory device to retrieve and process the stored output. Modules may also initiate communications with input or output devices and can operate on a resource (e.g., a collection of information).

Example Machine Architecture and Machine-Readable Storage Medium

Figure 10:
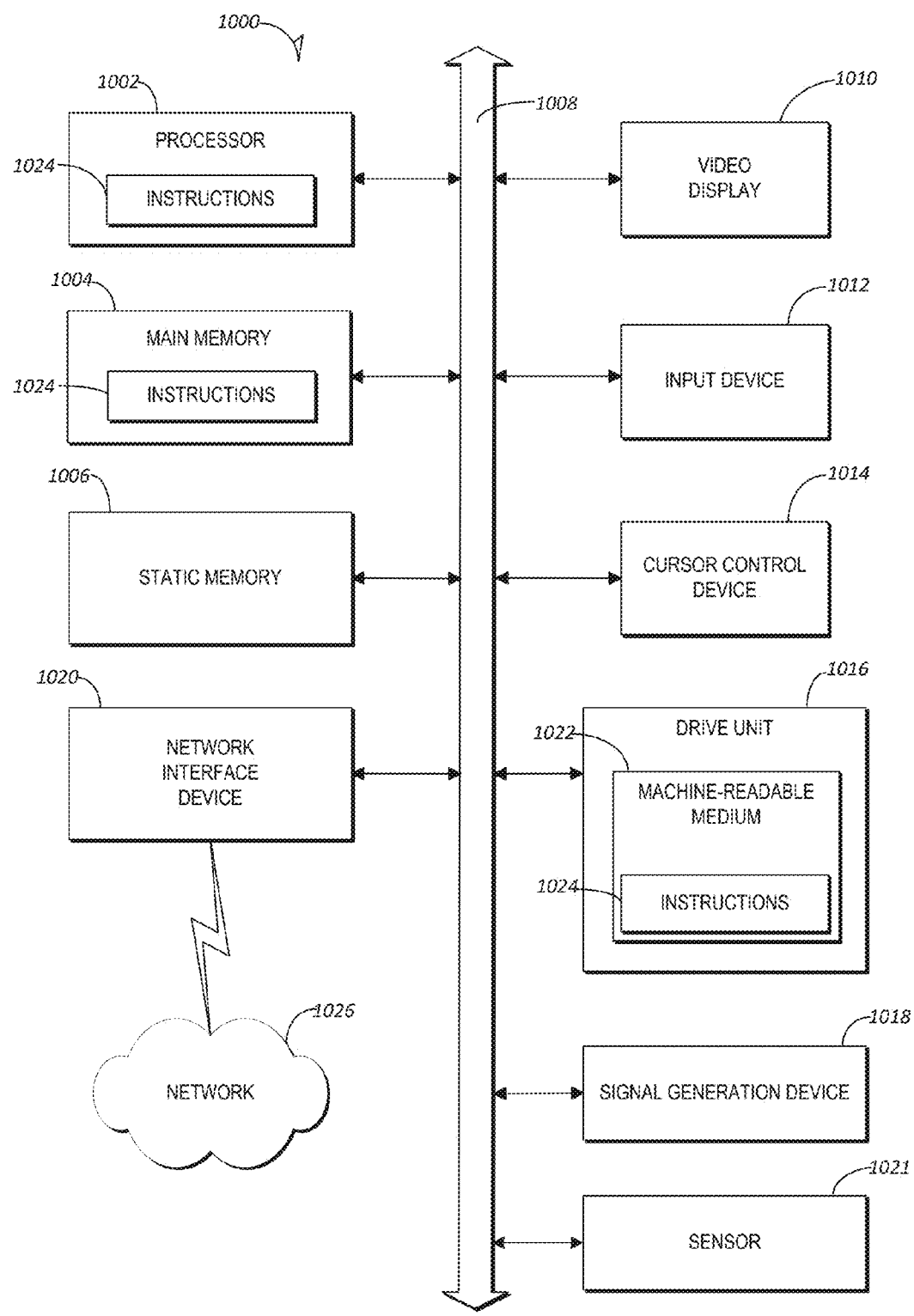
FIG. 10 is a block diagram of an example machine on which components of various embodiments of the system may be executed.

With reference to FIG. 10 an example embodiment extends to a machine in the example form of a computer system 1000 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine may be illustrated, the term "machine" shall also be taken to include any collection of machines that individually or jointly execute a set (or multiple sets) of instructions to perform any one or more of the methodologies discussed herein.

The example computer system 1000 may include a processor 1002 (e.g., a central processing unit (CPU), a graphics processing unit (GPU) or both), a main memory 1004 and a static memory 1006, which communicate with each other via a bus 1007. The computer system 1000 may further include a video display unit 1010 (e.g., a liquid crystal display (LCD) or a cathode ray tube (CRT)). In example embodiments, the computer system 1000 also includes one or more of an alpha-numeric input device 1012 (e.g., a keyboard), a user interface (UI) navigation device or cursor control device 1014 (e.g., a mouse), a disk drive unit 1016, a signal generation device 1018 (e.g., a speaker), and a network interface device 1020.

Machine-Readable Medium

The disk drive unit 1016 includes a machine-readable storage medium 1022 on which may be stored one or more sets of instructions 1024 and data structures (e.g., software instructions) embodying or used by any one or more of the methodologies or functions described herein. The instructions 1024 may also reside, completely or at least partially, within the main memory 1004 or within the processor 1002 during execution thereof by the computer system 1000, with the main memory 1004 and the processor 1002 also constituting machine-readable media.

While the machine-readable storage medium 1022 may be shown in an example embodiment to be a single medium, the term "machine-readable storage medium" may include a single storage medium or multiple storage media (e.g., a centralized or distributed database, or associated caches and servers) that store the one or more instructions. The term "machine-readable storage medium" shall also be taken to include any tangible medium that may be capable of storing, encoding, or carrying instructions for execution by the machine and that cause the machine to perform any one or more of the methodologies of embodiments of the present application, or that may be capable of storing, encoding, or carrying data structures used by or associated with such instructions. The term "machine-readable storage medium" shall accordingly be taken to include, but not be limited to, solid-state memories and optical and magnetic media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

Transmission Medium

The instructions 1024 may further be transmitted or received over a communications network 1026 using a transmission medium via the network interface device 1020 and utilizing any one of a number of well-known transfer protocols (e.g., Hypertext Transfer Protocol (HTTP)). Examples of communication networks include a local area network (LAN), a wide area network (WAN), the Internet, mobile telephone networks, Plain Old Telephone Service (POTS) networks, and wireless data networks (e.g., WiFi and WiMax networks). The term "transmission medium" shall be taken to include any intangible medium that may be capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present application. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived there from, such that structural and logical substitutions and changes may be made without departing from the scope of this disclosure. The Detailed Description, therefore, may be not to be taken in a limiting sense, and the scope of various embodiments may be defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present application. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present application as represented by the appended claims. The specification and drawings are, accordingly, to be regarded in an illustrative rather than a restrictive sense.

What is claimed is:

1. A method for determining the sentiment of a plurality of words as negative or positive, comprising:
   receiving, by one or more computer processors, a plurality of words from a user interface of a client machine;
   for each word in the plurality of words, testing whether the word indicates positive or negative sentiment by using a sentiment mining tool;
   responsive to detecting an indication of positive sentiment of the word, testing whether there is, in the plurality of words, a known negative word that was mined from the text of feedback from one or more ecommerce transaction logs;
   responsive to detecting that there is, in the plurality of words, no known negative word that was mined from the text of feedback from one or more ecommerce transaction logs, incrementing a positive word counter in one or more hardware processors;
   responsive to detecting an indication of negative sentiment of the word, testing whether the word is in a list of negative modifiers; and
   responsive to detecting that the word is not in the list of negative modifiers, incrementing a negative word counter in the one or more hardware processors.

2. The method of claim 1, the method further comprising:
   responsive to detecting that all words in the plurality of words have been tested, determining a numerical quantity from a count of the positive word counter and a count of the negative word counter; and
   testing the numerical quantity and, responsive to detecting the numerical quantity as being equal to or greater than a threshold, marking the plurality of words as positive sentiment, and, responsive to detecting the numerical quantity as being less than the threshold, marking the plurality of words as negative.

3. The method of claim 1 wherein testing whether the word indicates positive sentiment comprises detecting whether the word is a word that is in a preselected positive lexicon.

4. The method of claim 1 wherein testing whether the word that indicates negative sentiment comprises detecting whether the word is one of a negative modifier word, a contrasting conjunction word, or a word that is known to have a negative connotation.

5. The method of claim 1 wherein responsive to detecting that there is a known negative word in the plurality of words, flagging the plurality of words as indicating a negative sentiment.

6. The method of claim 1 wherein responsive to detecting that the word is in the list of negative modifiers, flagging the plurality of words as indicating a negative sentiment.

7. The method of claim 1 wherein the plurality of words comprises a second group of words formed by testing whether there is a punctuation mark in a first group of words and, responsive to detecting that there is no punctuation mark in the first group of words, using a probabilistic technique to break the first group of words into pluralities of words.

8. One or more computer-readable hardware storage device having stored therein a set of instructions which, when executed by one or more processors of a computer, causes the computer to execute operations comprising:
   receiving a plurality of words from a user interface of a client machine;
   for each word in the plurality of words, testing whether the word indicates positive or negative sentiment by using a sentiment mining tool;
   responsive to detecting an indication of positive sentiment of the word, testing whether there is, in the plurality of words, a known negative word that was mined from the text of feedback from one or more ecommerce transaction logs;
   responsive to detecting that there is, in the plurality of words, no known negative word in the plurality of words that was mined from the text of feedback from one or more ecommerce transaction logs, incrementing a positive word counter;
   responsive to detecting an indication of negative sentiment of the word, testing whether the word is in a list of negative modifiers; and
   responsive to detecting that the word is not in the list of negative modifiers, incrementing a negative word counter.

9. The one or more computer-readable storage device of claim 8, the operations further comprising:
   responsive to detecting that all words in the plurality of words have been tested, determining a numerical quantity from a count of the positive word counter and a count of the negative word counter; and
   testing the numerical quantity and, responsive to detecting the numerical quantity as being equal to or greater than a threshold, marking the plurality of words as positive sentiment, and, responsive to detecting the numerical quantity as being less than the threshold, marking the plurality of words as negative.

10. The one or more computer-readable storage device of claim 8 wherein testing whether the word indicates positive sentiment comprises detecting whether the word is a word that is in a preselected positive lexicon.

11. The one or more computer-readable storage device of claim 8 wherein testing whether the word indicates negative sentiment comprises testing whether the word is one of a negative modifier word, a contrasting conjunction word, or a word that is known to have a negative connotation.

12. The one or more computer-readable storage device of claim 8 wherein responsive to detecting that there is a known negative word in the plurality of words, flagging the plurality of words as indicating a negative sentiment.

13. The one or more computer-readable storage device of claim 8 wherein responsive to detecting the word is in the list of negative modifiers, flagging the plurality of words as indicating a negative sentiment.

14. The one or more computer-readable storage device of claim 8 wherein the plurality of words comprises a second group of words formed by testing whether there is a punctuation mark in a first group of words and, responsive to detection that there is no punctuation mark in the first group of words, using a probabilistic technique to break the first group of words into pluralities of words.

15. A system for determining the sentiment of a plurality of words as negative or positive, comprising:

one or more hardware processors and storage configured to receive a plurality of words from a user interface of a client machine;

for each word in the plurality of words, test whether the word indicates positive or negative sentiment by use of a sentiment mining tool;

responsive to detection an indication of positive sentiment of the word, test whether there is, in the plurality of words, a known negative word that was mined from the text of feedback from one or more ecommerce transaction logs;

responsive to detection that there is, in the plurality of words, no known negative word that was mined from the text of feedback from one or more ecommerce transaction logs, increment a positive word counter;

responsive to detection of an indication of negative sentiment of the word, test whether the word is in a list of negative modifiers; and responsive to detection that the word is not in the list of negative modifiers, increment a negative word counter.

16. The system of claim 15 the one or more hardware processors and storage further configured:

responsive to detection that all words in the plurality of words have been tested, determine a numerical quantity from a count of the positive word counter and a count of the negative word counter; and test the numerical quantity and, responsive to detection of the numerical quantity as being equal to or greater than a threshold, mark the plurality of words as positive sentiment, and, responsive to detection of the numerical quantity as being less than the threshold, mark the plurality of words as negative.

17. The system of claim 15 wherein the test for whether the word indicates positive sentiment comprises a detection of whether the word is a word that is in a preselected positive lexicon.

18. The system of claim 15 wherein the test for whether the word indicates negative sentiment comprises detection of whether the word is one of a negative modifier word, a contrasting conjunction word, or a word that is known to have a negative connotation.

19. The system of claim 15 wherein responsive to detection that there is a known negative word in the plurality of words, flag the plurality of words as indicating a negative sentiment.

* * * * *